US006804626B2

(12) United States Patent
Manegold et al.

(10) Patent No.: US 6,804,626 B2
(45) Date of Patent: *Oct. 12, 2004

(54) SYSTEM AND PROCESS TO ENSURE PERFORMANCE OF MANDATED SAFETY AND MAINTENANCE INSPECTIONS

(75) Inventors: Eric S. Manegold, Federal Way, WA (US); Daniel R. Mayer, Issaquah, WA (US); Charles Michael McQuade, Issaquah, WA (US)

(73) Assignee: Zonar Compliance Systems, Seattle, WA (US)

( * ) Notice: Subject to any disclaimer, the term of this patent is extended or adjusted under 35 U.S.C. 154(b) by 154 days.

This patent is subject to a terminal disclaimer.

(21) Appl. No.: 10/219,892

(22) Filed: Aug. 15, 2002

(65) Prior Publication Data

US 2003/0061005 A1 Mar. 27, 2003

Related U.S. Application Data

(63) Continuation-in-part of application No. 09/951,104, filed on Sep. 11, 2001, now Pat. No. 6,671,646.

(51) Int. Cl.[7] ........................... G06F 11/30; G21C 17/00
(52) U.S. Cl. ...................................................... 702/182
(58) Field of Search ............................. 702/83, 84, 94, 702/97, 127, 158, 182–185

(56) References Cited

U.S. PATENT DOCUMENTS

| 6,043,661 | A | * | 3/2000 | Gutierrez | 324/504 |
| 6,597,973 | B1 | * | 7/2003 | Barich et al. | 701/29 |
| 6,609,082 | B2 | * | 8/2003 | Wagner | 702/182 |
| 6,671,646 | B2 | * | 12/2003 | Manegold et al. | 702/127 |
| 2002/0147610 | A1 | * | 10/2002 | Tabe | 705/1 |

* cited by examiner

Primary Examiner—Michael Nghiem
(74) Attorney, Agent, or Firm—Ronald M. Anderson

(57) ABSTRACT

A handheld, portable device (20, 140, or 140') is used to store data that indicate an operator was sufficiently close to each of a plurality of components during a safety inspection to actually inspect the components. The portable device includes a sensor (46) that detects tokens (12, 16, 24), such as radio frequency identification tags, which are affixed adjacent to the components. Messages (58) appearing on a display (40, 152) of the portable device prompt the operator to proceed to each checkpoint, determine a state of the component disposed there, and if the component is not operating properly, indicate a plurality of predefined conditions from which the operator can choose to identify the observed condition of the component. The state and condition of each component entered during the safety inspection are stored as data that are subsequently transferred to a remote data storage site over a wire or wireless link.

51 Claims, 10 Drawing Sheets

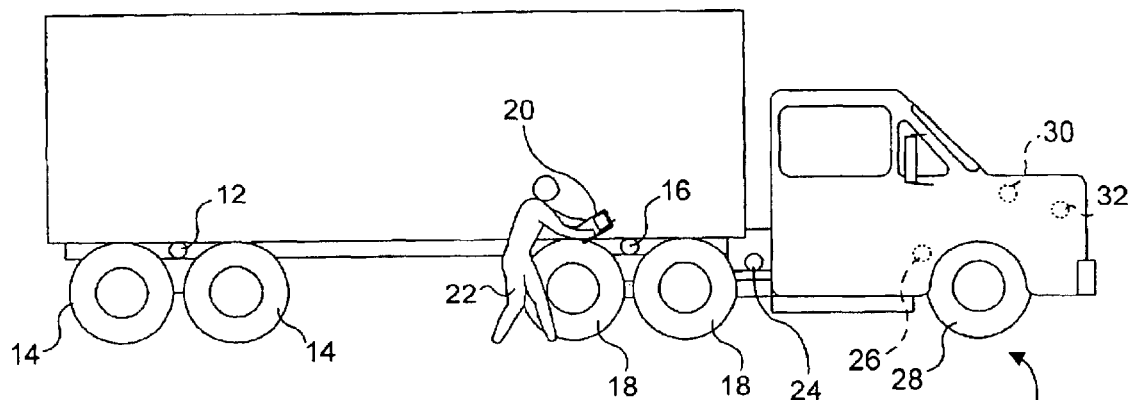
FIG. 1
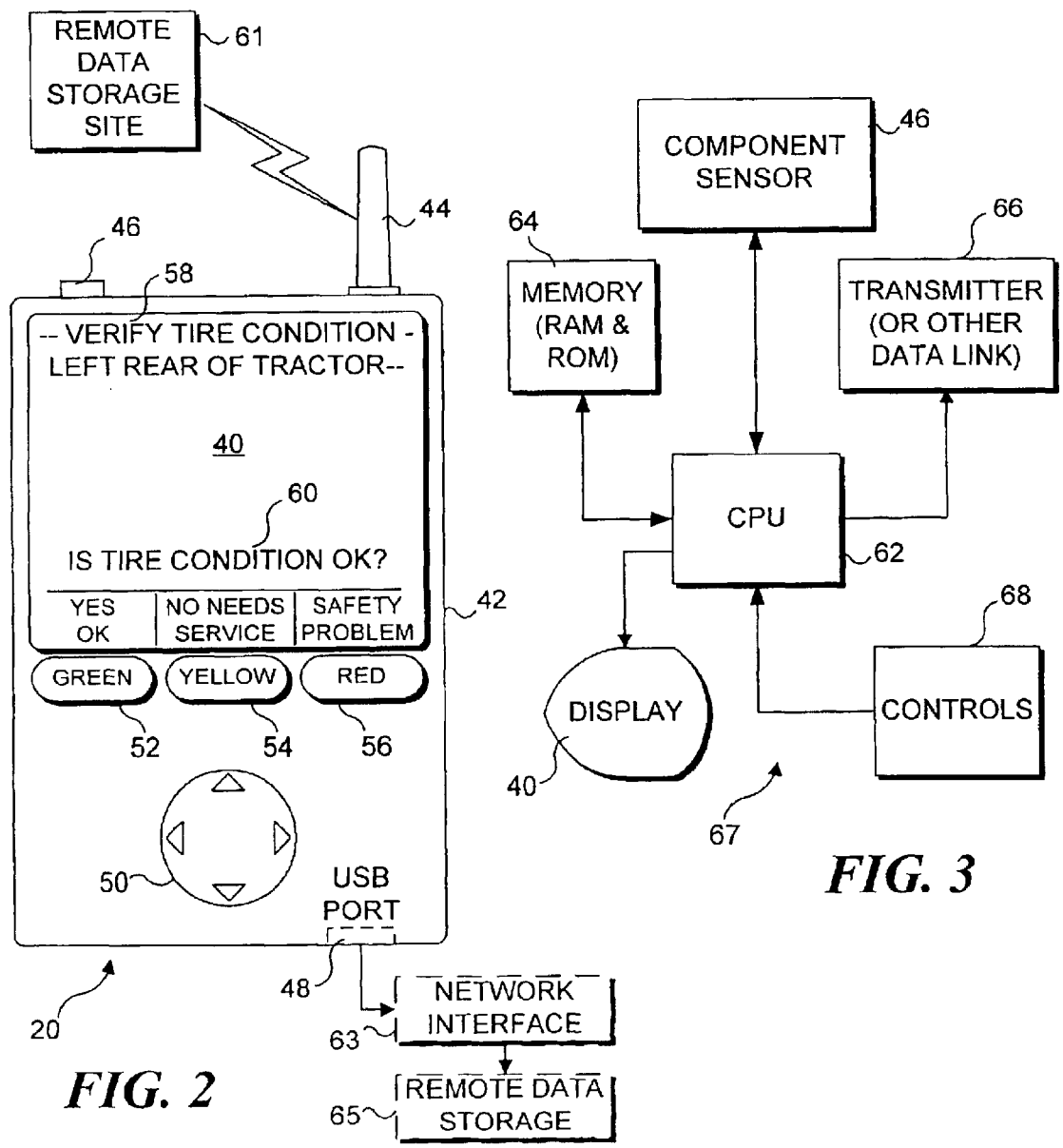
FIG. 2
FIG. 3

DRIVER'S VEHICLE INSPECTION REPORT
AS REQUIRED BY THE D.O.T. FEDERAL MOTOR CARRIER SAFETY REGULATIONS

CARRIER: _____

ADDRESS: _____

DATE: _____ TIME: _____ A.M. _____ P.M.

CHECK ANY DEFECTIVE ITEM AND GIVE DETAILS UNDER "REMARKS"

TRACTOR/
TRUCK NO. _____ ODOMETER READING _____

- ☐ AIR COMPRESSOR
- ☐ AIR LINES
- ☐ BATTERY
- ☐ BODY
- ☐ BRAKE ACCESSORIES
- ☐ BRAKES, PARKING
- ☐ BRAKES, SERVICE
- ☐ CLUTCH
- ☐ COUPLING DEVICE
- ☐ DEFROSTER/HEATER
- ☐ DRIVE LINE
- ☐ ENGINE
- ☐ EXHAUST
- ☐ FIFTH WHEEL
- ☐ FRAME AND ASSEMBLY
- ☐ FRONT AXLE
- ☐ FUEL TANKS
- ☐ GENERATOR

- ☐ HORN
- ☐ LIGHTS
  - HEAD - STOP
  - TAIL - DASH
  - TURN INDICATORS
- ☐ MIRRORS
- ☐ MUFFLER
- ☐ OIL PRESSURE
- ☐ RADIATOR
- ☐ REAR END
- ☐ REFLECTORS
- ☐ SAFETY EQUIPMENT
  - FIRE EXTINGUISHER
  - REFLECTIVE TRIANGLES
  - FLAGS - FLARES - FUSEES
  - SPARE BULBS & FUSES
  - SPARE SEAL BEAM

- ☐ SUSPENSION SYSTEM
- ☐ STARTER
- ☐ STEERING
- ☐ TACHOGRAPH
- ☐ TIRES
- ☐ TIRE CHAINS
- ☐ TRANSMISSION
- ☐ WHEELS AND RIMS
- ☐ WINDOWS
- ☐ WINDSHIELD WIPERS
- ☐ OTHER

TRAILER(S) NO.(S) _____

- ☐ BRAKE CONNECTIONS
- ☐ BRAKES
- ☐ COUPLING DEVICES
- ☐ COUPLING (KING) PIN
- ☐ DOORS

- ☐ HITCH
- ☐ LANDING GEAR
- ☐ LIGHTS - ALL
- ☐ ROOF
- ☐ SUSPENSION SYSTEM

- ☐ TARPAULIN
- ☐ TIRES
- ☐ WHEELS AND RIMS
- ☐ OTHER

REMARKS: _____
_____
_____
_____
_____
_____

☐ CONDITION OF THE ABOVE VEHICLE IS SATISFACTORY

DRIVER'S SIGNATURE: _____

☐ ABOVE DEFECTS CORRECTED
☐ ABOVE DEFECTS NEED NOT BE CORRECTED FOR SAFE OPERATION OF VEHICLE
MECHANIC'S SIGNATURE: _____ DATE: _____

DRIVER'S SIGNATURE: _____ DATE: _____

SYSTEM AND PROCESS TO ENSURE PERFORMANCE OF MANDATED SAFETY AND MAINTENANCE INSPECTIONS

RELATED APPLICATIONS

This application is a continuation-in-part application based on prior patent application Ser. No. 09/951,104, now U.S. Pat. No. 6,671,646, filed on Sep. 11, 2001, the benefit of the filing date of which is hereby claimed under 35 U.S.C. § 120.

FIELD OF THE INVENTION

The present invention generally provides evidence that a person was physically at a designated position adjacent to a component of a machine or apparatus, and more specifically, provides an electronic record indicating when the person was physically disposed to carryout a safety inspection and to indicate a safety related operating condition of the component.

BACKGROUND OF THE INVENTION

A recent network television news program reported that nearly 40 percent of big rig tractor-trailers were so dangerous that they would be ordered off the road if inspected. While not all accidents involving commercial trucks and trailers are the result of defective equipment that could be identified in a safety inspection, a significant reduction in accidents is likely to be achieved by taking steps to ensure that key components of such equipment are inspected.

In response to the public's concern for the increase in large vehicle traffic on our nation's highways and the increased frequency of reported accidents involving commercial vehicles, Congress adopted the Motor Carrier Safety Improvement Act of 1999 (PL 106–159). Pursuant to this Act, the Federal Motor Carrier Safety Administration (FMCSA) was created within the U.S. Department of Transportation (DOT). Part of the mission of this new agency is to develop a long-term strategy to "improve commercial motor vehicle, operator, and carrier safety." It is expected that by successfully addressing these issues, the incidence of accidents by commercial carriers will be reduced.

In furtherance of its mission, the FMCSA convened a series of meetings and planning sessions with representatives from other Federal agencies, the states, and the transportation industry. Through that process, FMCSA developed a policy entitled: "2010 Strategy—Saving Lives Through Safety, Innovation, and Performance." The primary goal of this policy is to improve transportation safety through the implementation of 31 strategic initiatives, which run the gamut from improved highway construction to better screening of drivers and equipment to detect potential equipment safety problems before they result in accidents.

The FMCSA's intention is to enhance motor carrier safety management practices through improved vehicle inspection, repair, and maintenance procedures. As acknowledged in the 2010 Strategy, "[I]f these functions are not conducted properly, driver and vehicle deficiencies can increase the potential for a crash." Among the nine separate strategies contemplated by FMCSA to achieve this important objective is "the introduction of new technology to improve safety performance." In stating its highest priorities, the 2010 Strategy further distills its 31 initiatives down to 13 "highest priority" strategies. Significantly, four of these highest priority strategies can be directly promoted with appropriate technology that will provide an electronic record of vehicle safety inspections and will tend to encourage such inspections. Specifically, it will be important to promote and encourage: (a) vehicle inspections with a focus on technology improvements; (b) improved safety management practices; (c) greater emphasis on technology transfer and deployment to achieve safe operating equipment; and (d) improved safety data collection and analysis.

To avoid accidents caused by defective equipment, Federal law presently requires that commercial drivers make a visual inspection of specific components on a truck (i.e., tractor and trailer), such as the brake system, fuel system, warning lights, tires, etc., performing pre- and post-trip inspections of these basic, but critical components. An exemplary vehicle inspection report listing the components and systems that must be inspected by a driver to satisfy the DOT regulations is illustrated in FIG. 7. However, under the current system, a driver is only required to fill out a paper log and keep it on file for 90 days. Many experts report that less than half of the drivers ever perform the check; instead, many drivers simply fill out the report while seated in the cab of the truck or in a coffee shop. The report is meaningless unless the listed components and systems have actually been inspected. For example, a driver who fails to actually inspect components on his vehicle will not notice that brake fluid is leaking from a hydraulic master brake cylinder. As a result, the brakes on the driver's truck may fail, potentially causing a serious accident.

A signed inspection report does not provide any assurance that a driver actually inspected the components included on the report. However, technology might provide a way to at least ensure that a driver (or other person doing a safety inspection) was physically present in the vicinity of each component requiring inspection, even if the driver is not compelled to affirmatively inspect all of the components. Most people, if required to actually walk to a component such as a tire of a truck, will then be more willing to at least look at the condition of the component, particularly if the task of indicating the condition of the component if there is a problem, is made relatively simple and efficient.

An analogous approach is employed to ensure that a night watchman visits different locations in a building. To provide evidence that he has made his rounds, the night watchman must use a key contained in a lock box at each different location to activate a handheld timekeeping device, making a record of the time that the location was visited. The night watchman thus provides proof of having visited each location for purposes of performing a security check at specified times. However, a night watchman cannot record a security violation with the handheld device, and a security check by a night watchman does not relate to making a safety inspection of a component at a specific location on a truck. Also, requiring that a key be stored in a lock box on a truck or other system that is being inspected is not practical, and it is not efficient to require a driver or other person doing a safety inspection to manually use a key or other physical object to provide proof that the person physically visited the location during the safety inspection tour.

It would be desirable for a person making a safety inspection to carry a handheld device that automatically detects when the person is in the proximity of a component included on an inspection list and enters a record of the results of the inspection in a non-volatile memory. A sensor in the handheld device should respond to a tag or transponder associated with a component being inspected when the sensor is within a predetermined distance from the tag, by recording the event and displaying a menu that prompts the operator to enter data related to a safety condition of the component. For example, once the operator is within a range appropriate to permit inspection of the tires on a truck, the handheld device should enable the person inspecting the tires to indicate: (a) that the tires appear safe; (b) that the tires need servicing but are still usable; or, (c) that the tires are too unsafe to be driven. If the component needs servicing or is unsafe to use, the operator should be able to record a reason for that determination. Since proof that an inspection was made prior to driving a vehicle and the conditions of the components that were inspected may have an important bearing on any insurance claims and/or liability in the event of an accident with the vehicle, it would also be desirable to enable the data from the handheld device to be uploaded to a geographically separate central data storage facility after the inspection is completed.

Encouraging safety inspections of other types of equipment by creating a record providing evidence that a person doing the inspection actually visited each component that must be inspected has utility in many other applications other than the transportation industry. The concept is also useful in confirming the safe operating condition of machinery and components in other systems in which accidents related to equipment malfunction and failure must be avoided. For example, such a need exists in high-risk chemical and petrochemical operations, where periodic inspections of valves, pressure vessels, gauges, and other components must be carried out to avoid potentially disastrous and costly accidents in which significant loss of life and property might occur.

There does not appear to be any prior art mechanical or electronic device designed to verify that a person was in a specific location for purposes of carrying out a safety inspection at that location. U.S. Pat. No. 5,680,328 discloses the use of electronic data entry equipment that simply takes the place of handwritten forms or checklists for recording data, but is unable to provide evidence that a person actually visited a component that was reportedly inspected. Other prior art references teach the transmission of data from a portable device to a central repository, by both wire and wireless network connections. The prior art also discloses that data from inspections can be used for generating safety or maintenance reports. However, the prior art does not disclose means to verify that a safety check was actually performed, or even that a person physically was in a position to carry out a safety inspection.

SUMMARY OF THE INVENTION

In accord with the present invention, a method is defined for providing a record indicating that a component of a vehicle or other type of apparatus or system was visited during a safety inspection. In this method, a portable device is provided for use in recording data related to the safety inspection. The portable device includes a sensor that produces a signal indicative that an operator has positioned the portable device proximate a component. A record of the signal produced by the sensor is made and is stored within the portable device, providing evidence that the operator was sufficiently close to the component to make a safety inspection of the component.

The method further includes the step of enabling the operator to store an indication of a condition of the component in the portable device. Preferably, the portable device provides a prompt that indicates the component the operator is to inspect. After the operator has inspected the component, a plurality of different states of the component are displayed to the operator, enabling the operator to select the state observed during the inspection. If the component needs servicing or is unusable, the operator can select one of a plurality of different possible conditions to indicate an observed condition of the component. A record of the condition selected by the operator is then stored in the portable device. The record of the signal, the state, and any condition selected by the operator are transferred from the portable device to a more permanent storage at a remote site that is separate from the portable device, either immediately after the inspection or at a later time. Preferably, each record is transmitted to the remote site using a data signal conveyed over a wire network and/or a wireless network.

The method further includes the step of affixing a token adjacent to the component. The sensor responds to the token to detect when the portable device is proximate the component. The token causes the signal produced by the sensor to identify the component, e.g., a specific tire on a vehicle or a specific system component of a system or other apparatus. In most applications, a plurality of tokens are provided, each token being associated with and affixed adjacent to a different one of the plurality of components. The token then causes the signal produced by the sensor to identify the component when the portable device is proximate the component associated with the token. Also, different predetermined ranges can be specified for the plurality of components, so that an appropriate predetermined range can be specified for each component.

Another aspect of the present invention is directed to a system for providing evidence that a plurality of components were visited during a safety inspection. The system includes a plurality of tokens, each of which is associated with a different component that is to be checked during the safety inspection and affixed adjacent to the component Also included in the system is the portable device, which is adapted to be transported to each component to be inspected during the safety inspection. The portable device includes a housing, a display, an operator interface, and a memory in which machine instructions and data are stored. A sensor included with the portable device detects when the portable device is proximate each of the plurality of tokens, and thus, within a predetermined maximum distance from each of the components with which the plurality of tokens are separately associated. The sensor then produces a signal indicative that the portable device is within the predetermined maximum distance from the component. A controller is coupled to the display, the memory, the operator interface, and the sensor and executes the machine instructions causing the memory to store data indicative of each component visited during the safety inspection in response to the signal produced by the sensor. Other functions implemented by the system are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 is a schematic diagram of a tractor and trailer equipped with tokens at each component to be inspected, illustrating a person using a portable device in accord with the present invention;

FIG. 2 is a top plan view of a portable device for use in making a safety inspection of a tractor and trailer, showing a message that prompts the operator to inspect the left rear tires of the tractor;

FIG. 3 is a schematic block diagram of the functional components included in the portable device of FIG. 2;

FIG. 7 (Prior Art) is an exemplary manually-completed inspection record used for safety inspections of tractors and trailers, illustrating the specific components and systems that are required to be inspected;

DESCRIPTION OF THE PREFERRED EMBODIMENTS

Utility of the Present Invention

Figure 4:
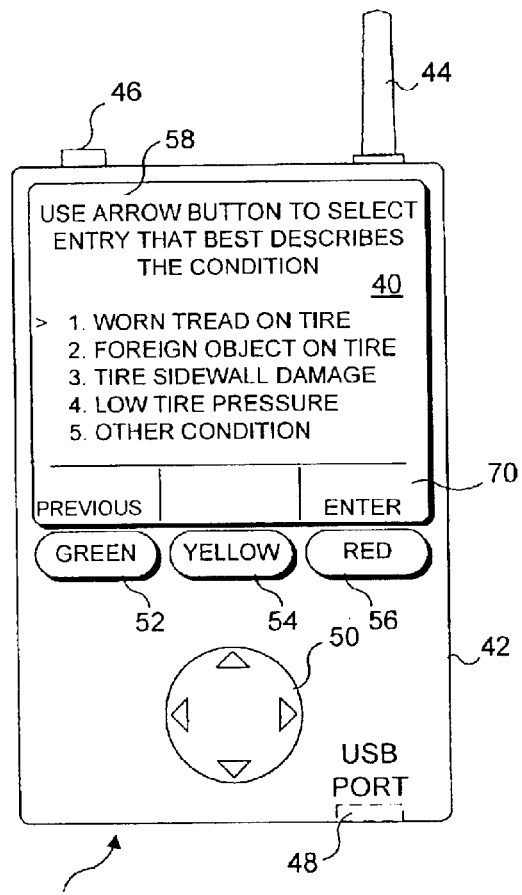
FIG. 4 is a top plan view of the portable device of FIG. 2, illustrating a menu that indicates possible conditions of tires in need of service.

The present invention is applicable in recording data resulting from a safety inspection of almost any type of equipment, apparatus, or system and is applicable to other types of inspections in which it is desirable to maintain a data record as evidence that the person making the inspection was actually physically present at a checkpoint or component requiring inspection. While the data accumulated with the present invention is not conclusively presumptive evidence that each component of a system was indeed carefully inspected, in most cases, if a person is required to visit a checkpoint or component, it is very likely that the person will actually inspect the component. By encouraging a person making an inspection to be physically close enough to a component to carry out an inspection, and by providing evidence of that fact in the data recorded, there is at least a justifiable presumption that the person actually did the inspection.

FIG. 1 illustrates a tractor-trailer 10 with which an embodiment of the present invention is usable to carry out a safety inspection. Tractor-trailer 10 is provided with a plurality of tokens affixed adjacent to each checkpoint or component that is to be inspected. While only a few of the tokens are illustrated in FIG. 1, FIG. 7 (Prior Art) lists all of the components or systems that should be inspected if a driver is to be in compliance with the DOT regulations regarding pre- and post-inspections of such vehicles. A token will preferably be affixed adjacent to the components and systems listed in FIG. 7, although several components might be associated with the same token. For example, in the engine compartment, one token might be used for both the radiator and the belts. As a driver moves about the tractor and trailer, evidence that the driver or the person doing the inspection moved sufficiently close to the components being inspected so that the inspection could actually take place is recorded in a a portable device 20 (first embodiment). Further details of portable device 20 and of other related embodiments are described below.

For the few tokens illustrated in FIG. 1, the relevance of the disposition of the token adjacent to a corresponding component of the tractor-trailer 10 should be evident. For example, token 12 is disposed adjacent to tandem dual rear tires 14 on the trailer. Since all the tires of the tandem dual rear wheels on the left rear of the trailer are readily visible from a position adjacent to token 12, a single token is sufficient to determine that the driver was sufficiently close so that all four tires at the left rear of the trailer could be readily inspected. Similarly, tandem dual wheels 18 on the left rear of the tractor are readily inspected when an observer 22 is positioned as shown in FIG. 1. In this position, the observer moves portable device 20 within a maximum predefined range of token 16, which is exposed above tandem dual wheels 18. Portable device 20, detects and responds to token 16, recording data indicating that the driver was in a position to inspect tandem dual rear wheels 18 on the tractor. It is contemplated that the operator may initiate the recognition of a token by activating a switch, or the portable device can instead simply respond when a token is sufficiently close to the portable device.

Other tokens 24, 26, 30, and 32 are illustrated adjacent other components of the tractor that are part of the safety inspection. For example, token 26 is affixed adjacent a tire 28 on the right front of the tractor, while tokens 30 and 32 are accessible if the front hood of the tractor is opened and are disposed adjacent the hydraulic brake master cylinder and the engine belts/radiator, respectively (not shown separately).

For each token there is a predetermined maximum distance that portable device 20 can be held from the token that will enable the portable device to detect the token, and thus the component that is associated with it in order to produce a record as evidence that the person holding the portable device was in a position to inspect the component. Depending upon the component to be inspected and the type of token, different predetermined maximum distances may be assigned to the various components. The different predetermined maximum distances might be implemented by partially shielding a token to vary the distance at which the portable device can detect the token.

Operator 22 is prompted to approach the next component in a series of components that must be checked during the safety inspection by a message 58 appearing on a display 40 of portable device 20, as shown in FIG. 2. For example, if operator 22 has just completed the inspection of tandem dual tires 14 on the left rear of the truck, display 40 provides a prompt 58 indicating that the operator should "verify tire condition—left rear of tractor." A sensor 46 on portable device 20 responds to token 16 when the portable device is held less than the predetermined maximum distance from token 16 by producing a signal indicating that the portable device was within the required range of tandem dual tires 18 to enable the operator to inspect the tires. Display 40 also provides a prompt 60 to operator 22 requesting that the operator indicate whether the tire condition is okay. If so, the operator presses a green control button 52 corresponding to the message "YES, OK." However, in this first embodiment of the portable device, if during the visual inspection of the tires the operator determines that they require servicing, the operator is prompted to depress a yellow control button 54 on the portable device. (The other embodiments of the portable device that are described below do not include a yellow control button, but instead invite the operator to indicate the condition of the component.)

Certain conditions such as a tread separation or a nail or other sharp object lodged in the tire would likely lead the person doing the inspection to depress a red control button 56, indicating a safety problem that requires the operator to refer to a supervisor who will likely elect to delay the trip until the tire is repaired and/or replaced or take other appropriate action depending upon the nature of the component and the type of problem that makes the component unsafe to use. Portable device 20 also includes a cursor control 50, which is a four-position switch that enables a cursor (not shown in this Figure) to be moved up or down, and left or right. Cursor control 50, green, yellow, and red control buttons 52, 54, and 56 and display 40 are all disposed on a front surface of a housing 42 of portable device 20. Sensor 46 is disposed on the top edge of housing 42, while an optional universal serial bus (USB) port 48 is disposed on the bottom edge of housing 42, opposite from sensor 46.

In this embodiment, an antenna 44 is also disposed on the top edge of the housing for transmitting radio frequency (RF) transmissions to a remote data storage site 61 that is used for long-term storage of data resulting from safety inspections. The data produced by a safety inspection indicates each of the components of the vehicle (or other system or apparatus being inspected) that were visited by the operator, so that the portable device was positioned within the predetermined maximum distance from the token associated with the component, and further indicates the status of the component. In the event that the component appears to need service or represents a safety problem (as would be evident if the operator depressed yellow control button 54 or red control button 56, respectively), the operator is prompted to select one of a plurality of predefined conditions that justify the state of the component determined by the operator and best represent its observed condition.

If the state of the component is okay so that green control button 52 is depressed, i.e., if the component does not require any service and is usable or otherwise within its nominal operating parameters, there is no need to provide an indication of the condition of the component. The condition need only be recorded as part of the data stored in the portable device if either yellow control button 54 or red control button 56 is depressed by the operator to indicate the state of the component being other than "OK."

A further example illustrating the selection of a condition relating to the example shown in FIG. 2 is included in FIG. 4. As shown in FIG. 4, if the operator has indicated that the state of the tires is such that they need service by pressing yellow control button 54, portable device 20 automatically displays several possible conditions that would have led an operator to indicate that state. In the example shown, message 58 prompts the operator to use the arrow button (i.e., cursor control 50) to select a possible condition from among the listed options that best describes the observed condition of the tires. Display 40 includes five possible conditions, the last of which covers any condition that might not be included among the first four that are listed. Using cursor control 50, the operator can move the cursor to the displayed statement that best describes the observed condition of the tire and then can depress red control 56, which corresponds to an "Enter" menu option 70 on display 40 for this screen. Green control 52 can be depressed to select a "Previous" display, if the operator elects to reconsider the state of the component that was previously selected.

FIG. 3 illustrates functional components 67 that are included in portable device 20, either on or inside housing 42. A central processing unit (CPU) 62 comprises the controller for portable device 20 and is coupled bi-directionally to a memory 64 that includes both random access memory (RAM) and read only memory (ROM). Memory 64 is used for storing data in RAM and machine instructions in ROM that control the functionality of CPU 62 when executed by it. CPU 62 is also coupled to receive operator input from controls 68. Collectively, controls 68 include green control button 52, yellow control button 54, red control button 56, and cursor control 50. In addition, CPU 62 provides text and graphics to display 40 for the prompts and other messages, and menu items and options from which the operator can select using cursor control 50.

After operator 22 has visited each of the checkpoints required for the safety inspection, the operator can optionally transmit the data that have been collected during the inspection to remote data storage site 61 through an RF transmission via antenna 44. The data provide evidence that the operator has visited the components and indicated the state and condition of the components that were visited and inspected. Alternatively, optional USB port 48 on portable device 20 can be coupled to a network interface 63 on an external cradle or docking station (an example of which is described below in connection with other embodiments of the portable device), which is in communication with remote data storage 65, as shown in FIG. 2. In FIG. 3, CPU 62 is shown communicating data to transmitter 66 (or through another data link) using a wire and/or wireless data communication link. The data collected and stored in memory 64 of portable device 20 during the safety inspection can thus be safely transferred to the remote data storage site and retained for as long as the data might be needed.

In some cases, it may be preferable to transmit the data to the remote site immediately after making a safety inspection to ensure that the data retained in memory 64 are not lost should an accident occur that destroys portable device 20. An accident destroying the evidence that the safety inspection was implemented could have an adverse effect during any litigation related to the accident, which might allegedly have been caused by one of the components inspected. However, since the risk of such an accident is relatively remote, it is contemplated that an operator may collect the data from a number of safety inspections in memory 64 and then subsequently upload the data to remote data storage 65 by coupling the data to the external cradle or docking station that includes a USB port terminal and network interface to couple over the Internet or other network to a remote storage. The cradle or docking station might be maintained by a carrier at a freight terminal at least periodically visited by the truck that was inspected.

Alternatively, the external cradle or docking station might be disposed at a different site and/or connect to the remote data storage site through other types of communication links. One example of such a communication system is the OMNITRACS™ satellite mobile communication system sold by Qualcomm Corporation that enables drivers on the road and carriers to remain in communication with each other and enables the carrier to monitor the location of a tractor-trailer during a trip. By linking portable device 20 through USB port 48 to such a data communication system, the data stored within memory 64 can readily be transmitted to a remote site maintained by the carrier for long-term storage, even while a trip is in progress.

The tokens that are affixed at various points on the tractor-trailer (or adjacent components of other types of systems or apparatus unrelated to a vehicle) can be of several different types, depending upon the type of sensor 46 that is included on portable device 20. In a preferred form of the present invention, the token that is preferably employed is a radio frequency identification (RFID) tag that is attached with a fastener or an appropriate adhesive to a point on a frame or other support (not shown) adjacent to the component associated with the token. One type of RFID tag that is suitable for this purpose is the WORLDTAG™ token that is sold by Sokymat Corporation. This tag is excited by an RF transmission from portable device 20 via antenna 44. In response to the excitation energy received, the RFID tag modifies the RF energy that is received from antenna 44 in a manner that specifically identifies the component associated with the RFID tag, and the modified signal is detected by sensor 46.

An alternative type of token that can also be used in this invention is an IBUTTON™ computer chip, which is armored in a stainless steel housing and is readily affixed to a frame or other portion of the vehicle (or other type of apparatus or system), adjacent to the component associated with the IBUTTON chip. The IBUTTON chip is programmed with JAVA™ instructions to provide a recognition signal when interrogated by a signal received from a nearby transmitter, such as from antenna 44 on portable device 20. The signal produced by the IBUTTON chip is received by sensor 46, which determines the type of component associated with a token. This type of token is less desirable since it is more expensive, although the program instructions that it executes can provide greater functionality.

Yet another type of token that might be used is an optical bar code in which a sequence of lines of varying width encode light reflected from the bar code tag. The encoded reflected light is received by sensor 46, which is then read by an optical detector. Bar code technology is well understood in the art and readily adapted for identifying a particular type of component and location of the component on a vehicle or other system or apparatus. One drawback to the use of a bar code tag as a token is that the bar code can be covered with dirt or grime that must be cleaned before the sequence of bar code lines can be properly read. If the bar code is applied to a plasticized adhesive strip, it can readily be mounted to any surface and then easily cleaned with a rag or other appropriate material.

Yet another type of token usable in the present invention is a magnetic strip in which a varying magnetic flux encodes data identifying the particular component associated with the token. Such magnetic strips are often used in access cards that are read by readers mounted adjacent to doors or in an elevator that provides access to a building. However, in the present invention, the magnetic flux reader comprises sensor 46 on portable device 20. The data encoded on such a token are readily read as the portable device is brought into proximity of the varying magnetic flux encoded strip comprising the token.

As yet another alternative, an active token can be employed that conforms to the BLUETOOTH™ specification for short distance data transfer between computing devices using an RF signal. However, it is likely that the range of the signal transmitted by the token would need to be modified so that it is substantially less than that normally provided by a device conforming to the BLUETOOTH specification. It is important that the portable device be able to detect that it is proximate to the component only within a predetermined maximum range selected to ensure that the operator is positioned to actually carry out an inspection of the component.

Logical Steps Implemented in the Present Invention

Figure 5:
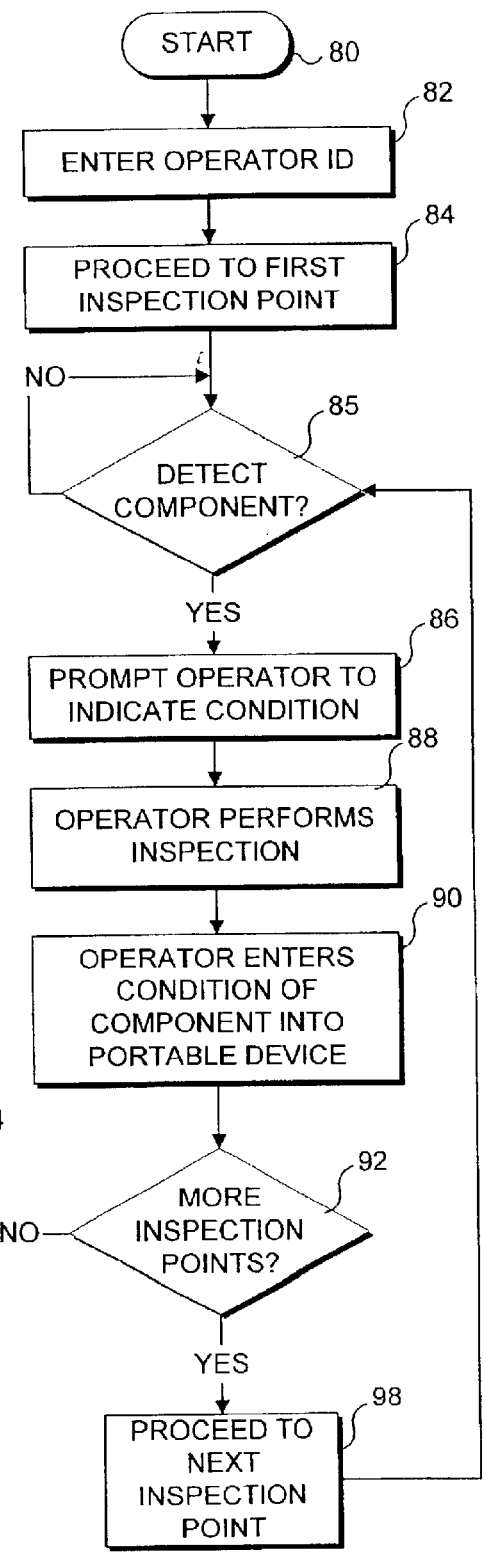
FIG. 5 is a flow chart showing the steps followed in carrying out a safety inspection in accord with the present invention.

FIG. 5 illustrates the logical steps implemented in connection with the present invention to carry out a safety inspection of a vehicle or other apparatus or system. From a start block 80, a step 82 provides for manual entry of an operator identification (ID) into a data record, or the operator ID can already be stored in memory of the portable device, or can be automatically entered in response to a special operator ID tag disposed on the vehicle. Cursor control 50 is employed to sequentially select digits from a displayed list, to input the operator ID for the individual making the safety inspection. The operator ID might be a four (or more) digit number or alphanumeric code. Alternatively, a plurality of possible operator IDs might be displayed as a list on portable device 20, enabling the operator to select his/her operator ID from the list using cursor control 50 and one of the three control buttons.

Once the operator ID is entered, portable device 20 prompts the operator to proceed to a first inspection point at a step 84. For example, as indicated in FIG. 2, message 58 prompts the operator to verify the tire condition on the left rear of the tractor. A decision step 85 determines if the portable device has detected the token associated with the component that is next to be inspected. If not, the logic loops until the component is detected. Once sensor 46 on portable device 20 has detected the token associated with the current component to be inspected, the logic then advances to a step 86 in which the operator is prompted to indicate a state of the component (and possibly, its condition). In a step 88, the operator performs the inspection, which may involve visually observing the state and condition of the component, or carrying out other steps that might be required to confirm the state and condition of the component. It is contemplated that in some types of inspections, a series of one or more steps might be required to test the component to determine if it is operating properly, needs maintenance or repair, or is unusable. Again, portable device 20 can be programmed to provide appropriate prompts to direct the operator through the series of steps required to carry out the inspection of such a component. Accordingly, in a step 90 the operator selectively enters the condition of the component into portable device 20 using the control buttons and cursor control 50.

A decision step 92 determines if there are further inspection points in the safety inspection currently being carried out. If not, a step 94 provides for transmitting or loading the inspection data into storage at a remote site; this step can be done immediately after the inspection is completed, or at some later time, perhaps after additional safety inspections have been completed, and/or after the portable device has been inserted into the external cradle or docking station. Once the data are transmitted to the remote site for long-term storage, the process is completed in a step 96.

Assuming that further inspection points remain in the safety inspection at decision step 92, a step 98 provides for the operator to proceed to the next inspection point, which will again be determined by a prompt displayed to the operator on display 40 of portable device 20. The logic then loops back to decision step 85, which determines if the sensor on the portable device has detected the component, indicating that the portable device is within the predefined maximum range of the token, thus ensuring that the operator is sufficiently close to the component to inspect it.

Figure 6:
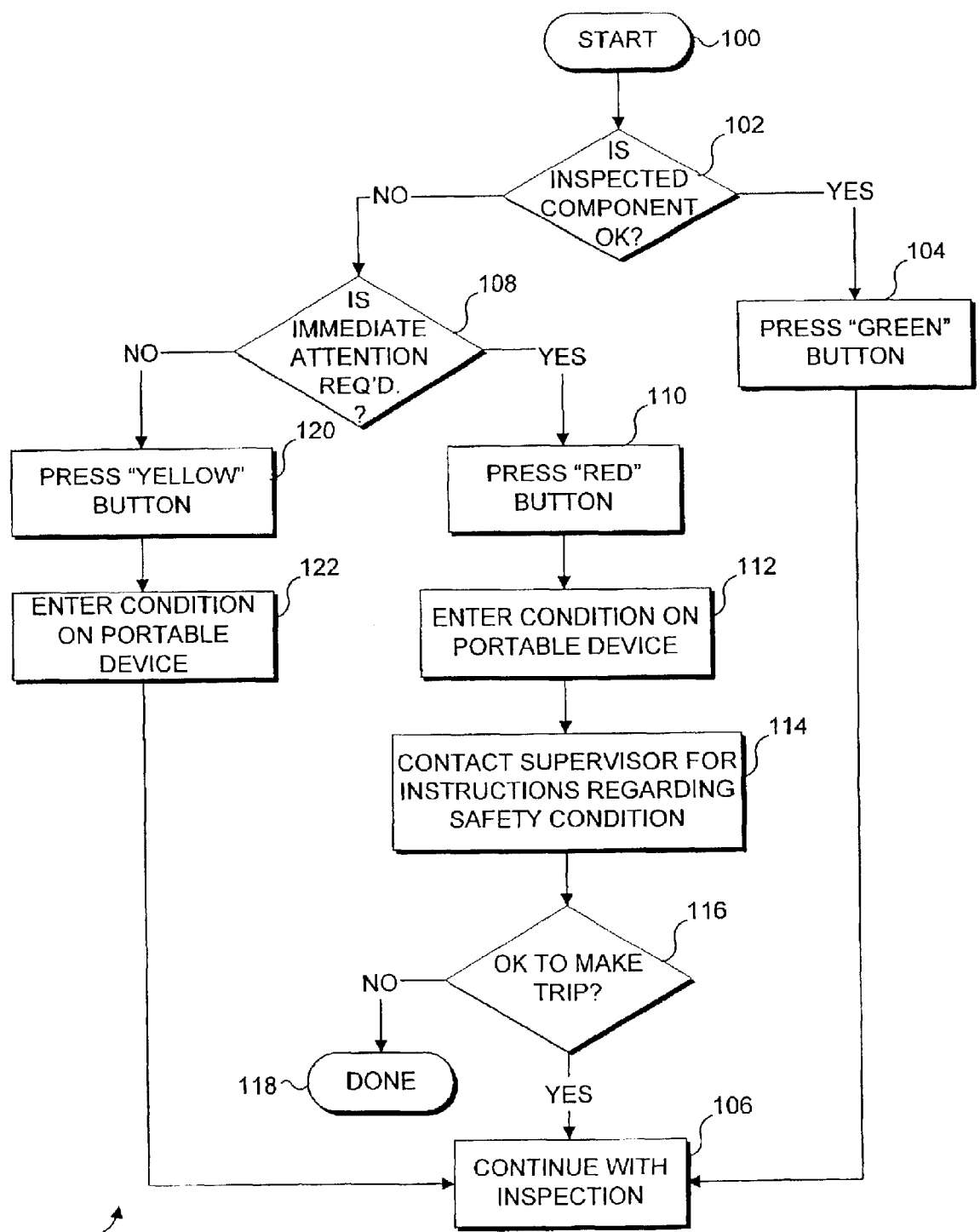
FIG. 6 is a flow chart illustrating the steps employed in recording a condition of a component that is being inspected using the portable device of FIGS. 2 and 4.

Further details of step 90 are illustrated in FIG. 6. From a start block 100, a decision step 102 determines if the inspected component is okay. If so, the operator presses green control button 52 in a step 104. Since the component is okay, nothing further is required for that component, and the logic then proceeds to a step 106, which provides that the operator can continue with the inspection, i.e., proceed with decision step 92 in FIG. 5.

However, if the determination in decision step 102 indicates that the inspected component is not okay, a decision step 108 enables the operator to determine if immediate attention is required. If so, the operator presses red control button 56 at a step 110 and enters the condition of the component on the handheld unit. For example, if the operator is inspecting a tire and determines that the tread of the tire is separating, i.e., that the tire should not be used but should instead be replaced, the operator would use the cursor control on the portable device to select an option for the condition "tread separating from tire" at a step 112. In many types of inspections, the operator will be required to contact a supervisor for instructions regarding the safety condition, at a step 114. In the example just noted, the supervisor would likely arrange for the tire to be replaced by maintenance or repair personnel before the operator makes a trip in the vehicle.

In some cases, a supervisor might override the operator's determination of the state of the component based upon the reported condition. Therefore, a decision step 116 determines if the supervisor has given authorization to the operator to make the trip, scheduling a later repair of the component. If so, the logic proceeds to step 106, in which the operator continues with the inspection as described above. If not, there is no further need to inspect the remainder of the vehicle at that point, since the complete inspection will need to be carried out again after the unsafe condition has been corrected, e.g., by replacing the defective tire. The logic is then done, as indicated in step 118.

In the event that the operator determines that immediate attention is not required at decision step 108, at a step 120, the operator presses yellow control button 54 on portable device 20. The operator then selects and enters the condition noted on the portable device, as indicated in a step 122. In the example shown in FIG. 4, six possible conditions are indicated by statements on display screen 40 for a tire that is still usable but needs service. In this case, the operator employs cursor control 50 to move the cursor to a selected statement that thus describes the observed condition of the component and then depresses red control button 56 to enter the condition, creating a record of the state and condition of the component currently being inspected that is retained within the memory of the portable device. Thereafter, the logic proceeds to step 106, in which the operator continues with the inspection.

Alternative Embodiments of Portable Device

Figure 8:
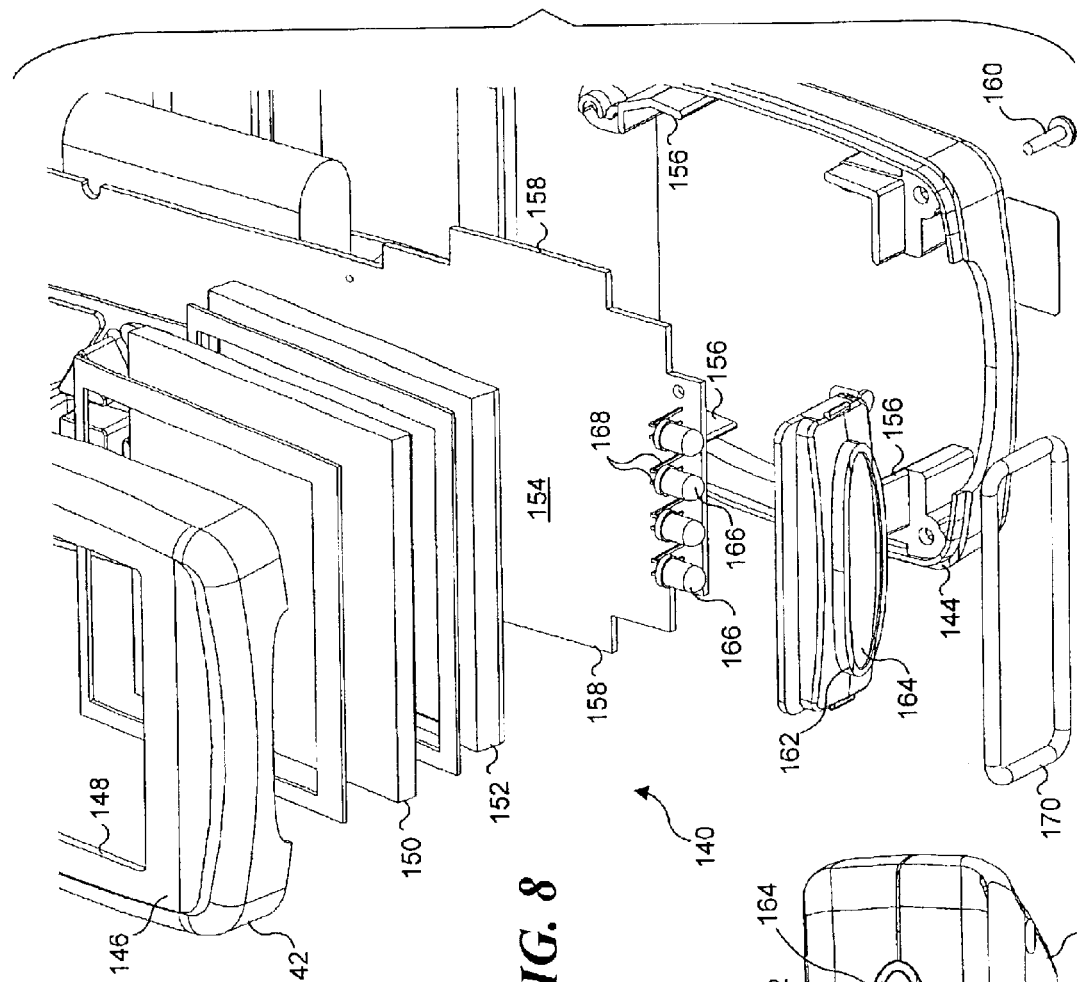
FIG. 8 is an exploded isometric view of a portion of a second embodiment of the portable device that includes a plurality of lights.
Figure 9:
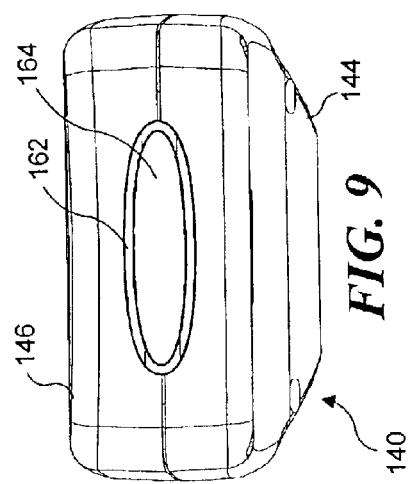
FIG. 9 is an isometric view of a front portion and lower surface of the second embodiment of FIG. 8.

Two additional embodiments of the portable device are illustrated in FIGS. 8 and 9, and 10 and 11, respectively. A portable device 140, which is shown in FIGS. 8 and 9, has a top housing 142, that is joined to a bottom housing 144 and includes a display bezel opening 148. Only a portion of a top surface 146 of the top housing is illustrated in this Figure, although further details of the top surface are generally similar to the embodiment shown in FIG. 11, which is discussed below.

As clearly illustrated in the exploded view of FIG. 8, a substantially transparent protective plastic window 150 is mounted behind display bezel opening 148 to protect the upper surface of a liquid crystal display (LCD) 152. LCD 152 underlies the protective plastic window and is mounted on a printed circuit (PC) board 154, along with a number of other components (including CPU 62, memory 64, component sensor 46, and control 68, as shown and described above in connection with FIG. 3). A plurality of corner supports 156 engage side tabs 158 on PC board 154. In addition, a plurality of threaded fasteners 160 (only one of which is shown) extend between top housing 142 and bottom housing 144, to secure the two housings together, locking PC board in a position defined by corner supports 156 in cooperation with side tabs 158.

A front bezel 162 is seated at a front end of top housing 142 and bottom housing 144 and includes a lens 164 that is substantially transparent and serves to focus light emitted by a plurality of light emitting diodes (LEDs) 166, which emit white light. LEDs 166 are electrically coupled to PC board 154 by leads 168, which are soldered to appropriate electrically conductive trace connections (not shown) on the PC board 154. An elastomeric seal 170 is fitted around front bezel 162 to seal out dirt, moisture, and other contaminants from the interior of portable device 140. Since LEDs 166 are disposed immediately behind lens 164, the white light emitted by the LEDs is generally focused by lens 164 so that it can be directed by the operator of the portable device onto a component that is being inspected. Such components are sometimes disposed in areas that are not well illuminated by ambient light. Thus, the light from LEDs 166 better enables an operator to use portable device 140 to more clearly see a component that is being inspected and to better observe the condition of the component in order to determine its safety status. Including LEDs 166 on the portable device avoids the need to use a separate flashlight or other source of light to inspect components that are not well lighted by ambient light, or which must be inspected at night.

Figure 10:
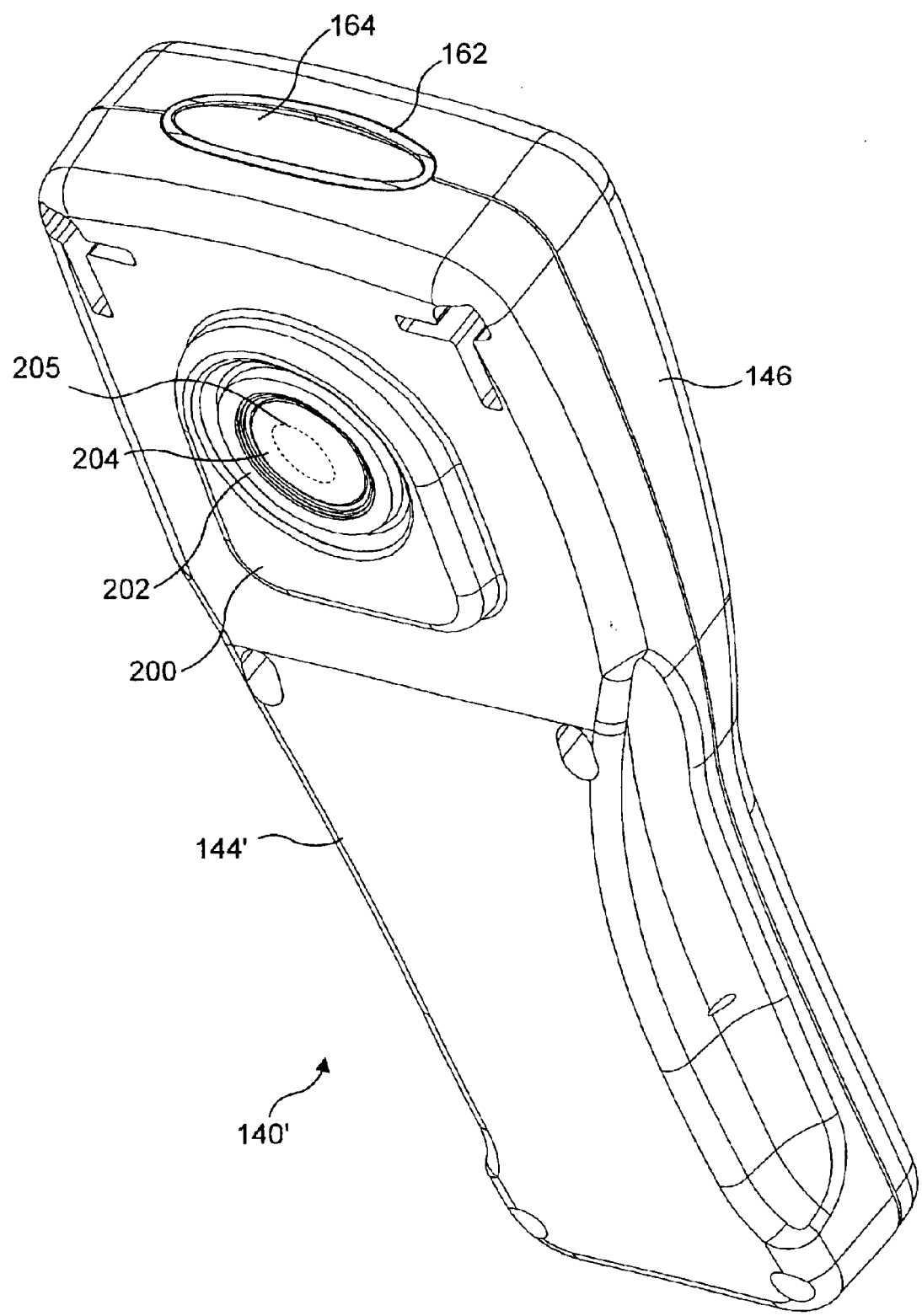
FIG. 10 is an isometric view of the lower surface of a third embodiment of the portable device that includes a digital camera.
Figure 11:
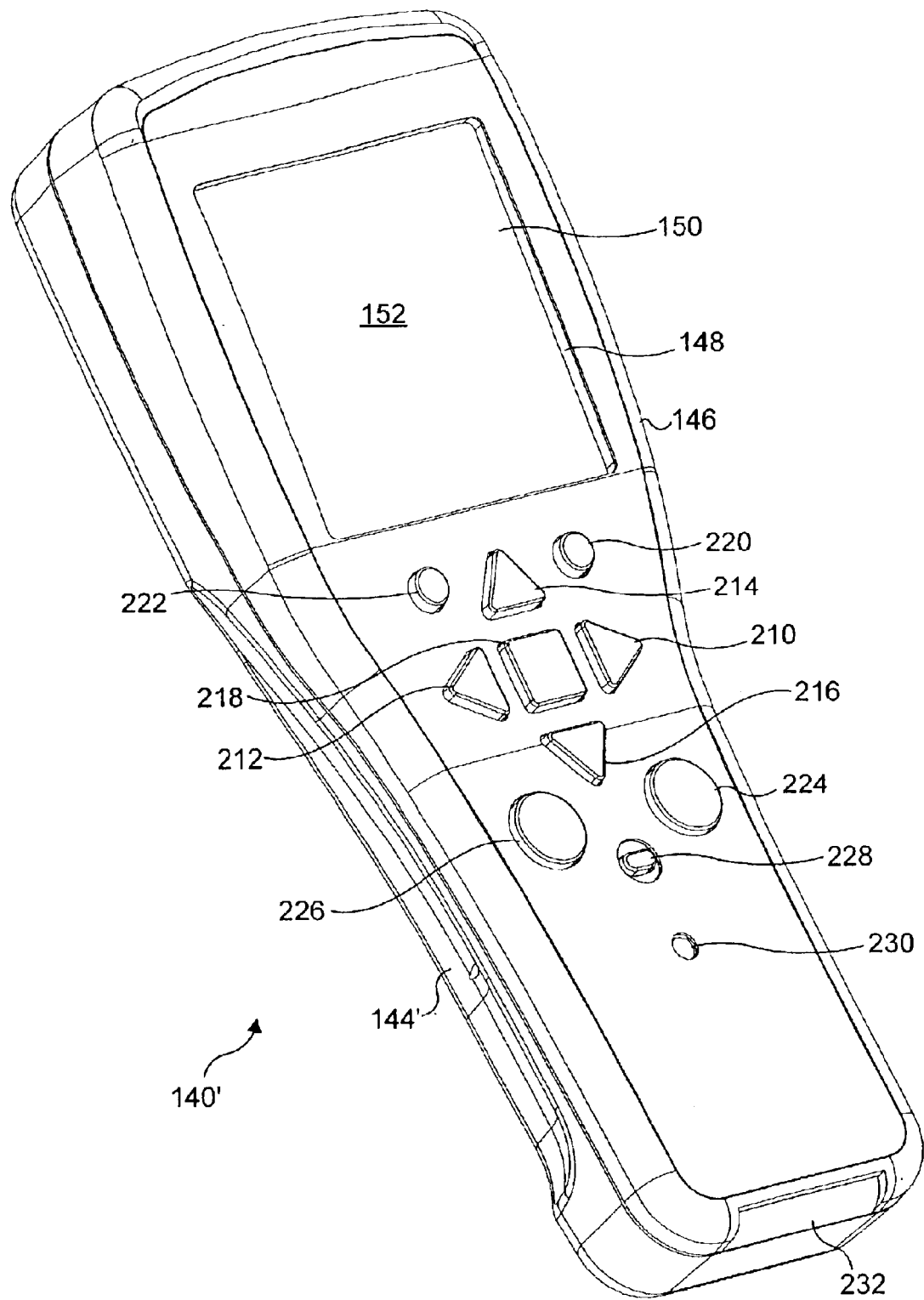
FIG. 11 is an isometric view of the upper surface of either the second or third embodiments.

A portable device 140' is illustrated in FIGS. 10 and 11, and like portable device 140, also includes a light source that can be selectively energized by an operator to illuminate a component that is being inspected, or for other purposes. However, portable device 140' also includes a digital camera 200 that can be selectively activated by a user to record an image, e.g., an image of a component that is being inspected. Accordingly, if an operator makes a decision regarding the safety status of a component or makes a decision to replace a component, a digital image captured by digital camera 200 can provide evidence that justifies the decision made by the operator. Portable device 140' is substantially identical to portable device 140 in most respects, except that it has a lower housing 144' in which digital camera 200 is included. Digital camera 200 has a bezel 202 that supports a lens 204 for receiving light from a component that is being imaged by the digital camera. A light sensitive element 205 disposed inside the housing and mounted to an underside of the PC board is shown with a dashed line. The light sensitive element, which may comprise an array of charge coupled devices (CCDs) or a complimentary metal-oxide semiconductor (CMOS), produces digital data corresponding to the light intensity at each pixel within a digital image that is being recorded. Although a higher quality might be achieved with a CCD light sensor, lower cost CMOS light sensors have recently become available that can also be used for the light sensitive device of the digital camera. Such devices are available from a number of different sources and can readily be integrated into portable device 140'.

For purposes of aiming and framing a desired image to be captured by digital camera 200, display 152 is switched to an imaging mode to display an image of the component. When framed as desired, the image shown on the display can be captured in real time, in association with the digital data corresponding to component being imaged and the image data can be stored within memory 64 (FIG. 3) of portable device 140'. It is not expected that an operator will need to record image data for each component being inspected, since only those components having a condition other than okay might need to be photographed with the digital camera, as evidence of the status of the component, should any question regarding the operator's decision subsequently arise. The image data produced by digital camera 200 will likely be stored in a compressed format, such as the Joint Photographic Experts Group (JPEG) format which employs a lossy compression scheme, as is commonly done with other digital cameras. The image data will thus be retained with the other data input by the user during an inspection and will be downloaded to long-term storage with the other data from the inspection.

FIG. 11 illustrates further details of top surface 146 of portable device 140' (and 140). Controls included on the front surface include a Right cursor control button 210, a Left cursor control button 212, an Up cursor control button 214 and a Down cursor control button 216. Centered between these four control buttons is a Read/Enter control button 218, which is depressed when a user wants to enter a selection currently highlighted (selected) on display 152. Since both portable device 140 and portable device 140' include the internal white LED light source, a light power switch 220 is included that can be momentarily depressed by a user to energize the LEDs, to illuminate a component that is being inspected, or to produce light for some other purpose of the operator. Adjacent to Up cursor control button 214 and opposite from light power switch 220 is an Info/Menu button 222 that can be depressed at any time to bring up a current menu on display 152. During the inspection, while viewing the condition of each component being inspected, the user will have an option and will be prompted to press either a green control button 224, which is also pressed to indicate a Yes condition, or a red control button 226, which is also pressed to indicate a No condition.

Neither the second or third embodiments of the portable device include a yellow button. Instead, if the condition of the component is not okay, the operator is simply prompted to select one of several predefined conditions that represent the status of the component being inspected, which can range from a condition in which the component may still be usable, to a condition that justifies immediate repair/replacement of the component. These conditions are presented to the operator on display 152. Using the cursor control buttons, the operator selects the appropriate entry of the condition on the display and depresses Read/Enter control button 218. Furthermore, if the condition of a component is not okay, the operator will be prompted to record a digital image of the component. If the operator presses green button 224 in response to this prompt, display 152 will then switch to the image display mode to show the image that might be captured by digital camera 200. Once the operator has directed lens 204 of the digital camera and positioned the portable device so as to frame the component as desired, as indicated by the image on display 152, the operator depresses Read/Enter control button 218 to capture the image of the component, storing the corresponding image data produced by the digital camera within the memory of the portable device.

A power On/Off switch 228 is disposed between green control button 224 and red control button 226 and slightly offset therefrom. Below the power On/Off switch is a charge indicator 230, for indicating the charge condition of the internal battery supply (not shown) that is contained within the housing of the portable device. A power/data connector port 232 is disposed on an end of the portable device for connecting to an external cradle or docking station, which is discussed in greater detail below. Neither portable device 140 nor portable device 140' include an external stub antenna, as in the first embodiment. Instead, an antenna (not shown) is included internally within the upper and lower housings of the portable device. Use of an internal antenna is preferred, since it avoids potential breakage of an external antenna. It has been determined that an external antenna is not required for sensing RFID tokens. However, like the first embodiment of the portable device described above, portable devices 140 and 140' are used to sense when the portable device is within sufficient range of a token to ensure that the operator is then positioned to inspect a component, to determine the safety status of the component, or to evaluate some other parameter of the component. The other types of tokens and sensors discussed above in connection with the first embodiment of the portable device are also contemplated for use with either the second or third embodiments of the portable device. Accordingly, those options need not be further discussed in regard to portable devices 140 or 140'.

Figure 12:
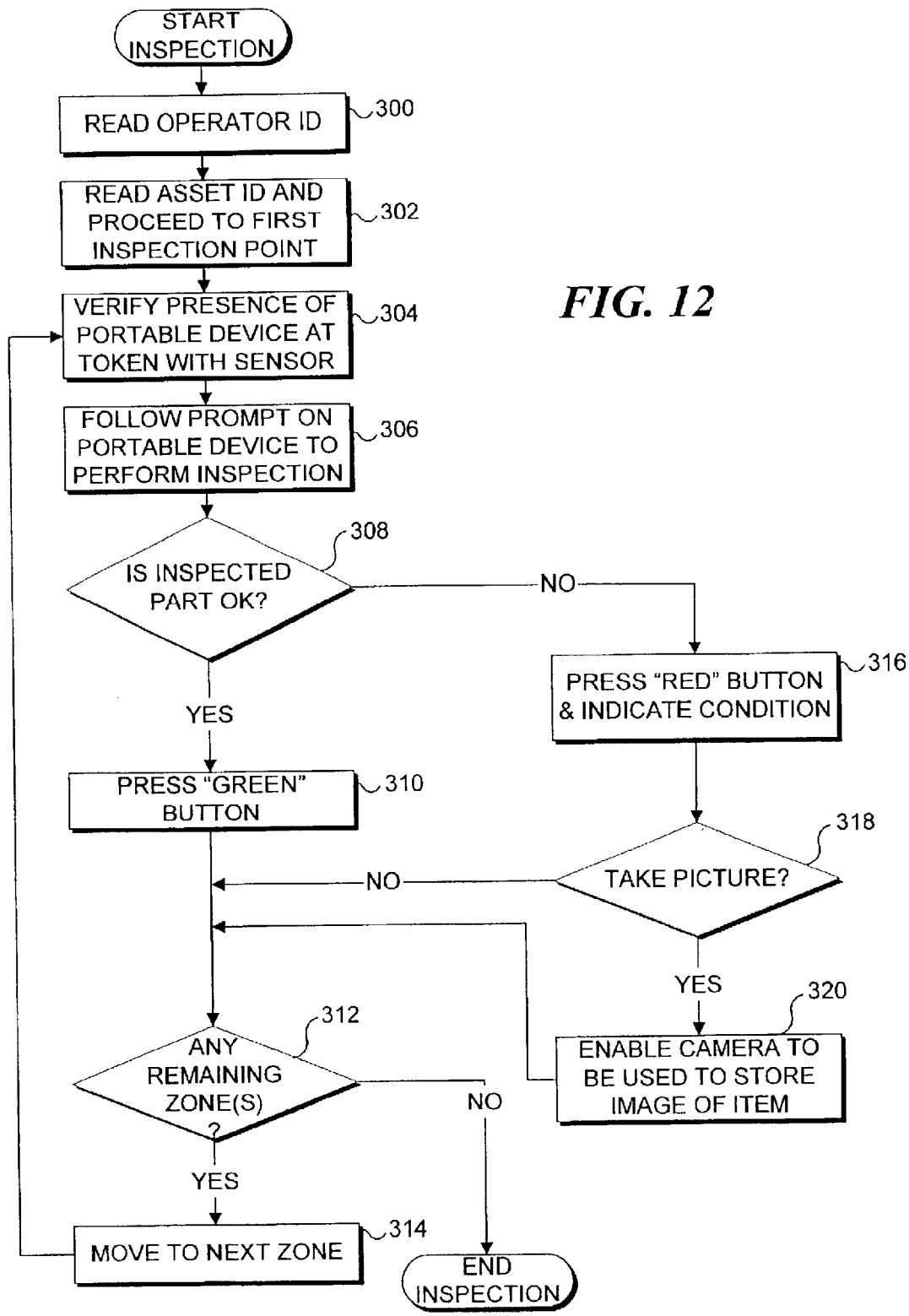
FIG. 12 is a flow chart illustrating the steps implemented during a safety inspection in which the user has an option to record a digital image of a component being inspected.

FIG. 12 illustrates the steps involved in using either portable device 140 or 140' in connection with carrying out an inspection on a vehicle or other type of apparatus or processing facility. Carrying the portable device, an operator starts the inspection, and as indicated in a step 300 uses the portable device to read an operator ID, to input data identifying the operator who is currently using the portable device. This ID can be read from a token associated with the operator, for example, a token that is carried by the operator on a keychain or as a part of a photo identification card. The operator ID is then recorded as part of the data associated with the current inspection and stored in the memory of the portable device for later transmittal and storage at a remote site.

A step 302 then provides that the operator reads an asset ID for the vehicle or apparatus or processing equipment being inspected, which is also stored within the data associated with the current inspection and is provided by a token, which is attached to the asset. Alternatively, the operator might manually enter an asset ID before undertaking the inspection. Having input the asset ID, the operator proceeds to the first inspection point.

In a step 304, the presence of the portable device (and of the operator) is verified at a token fixed adjacent to the first inspection point. The portable device automatically senses the token and stores data providing proof that the operator had physically carried the portable device to the inspection point associated with the token. Next, a step 306 indicates that a prompt to the operator is displayed on the portable device, indicating the next steps of the inspection to the operator. As noted above, a series of inspection steps may be required to complete an inspection of a specific component, or the operator may be prompted to inspect several components that are all associated with the current token. Following step 306, in a decision step 308, the operator determines if the inspected part is okay. If so, the operator presses the green control button on the portable device as indicated in a step 310. A decision step 312 then determines if there are any remaining zones or points to be inspected during the current inspection and if so, a step 314 provides that the operator moves to the next zone or point where one or more components are disposed that require inspection. The logic then returns to step 304. Alternatively, if there are no remaining zones, the operator has concluded the inspection.

Returning to decision step 308, in the event that the inspected part or component is not okay, the operator would press the red control button at a step 316 and as prompted on the display, would enter or select a condition of the component that led the operator to conclude that its condition was not okay. Display 152 on the portable device would then prompt the operator to decide whether to take a picture, at a decision step 318, of the component (this option only applies to portable device 140'). If the operator decides to take a picture of the component, a step 320 enables digital camera 200 to be used to create image data for the item. As described above, display 152 shows the image that is to be recorded in real time, enabling the operator to frame the picture by positioning the portable device relative to the component so that the desired image of the component appears on the display. The operator then presses the Read/Enable control button, capturing the image as it thus appears on display 152, so that the image data are recorded within the memory of the portable device. Thereafter, the logic continues with decision step 312. If the user is employing portable device 140 rather than portable device 140', following step 316, the logic would proceed directly to decision step 312, since there would be no option for taking a picture.

Docking Station

Figure 14:
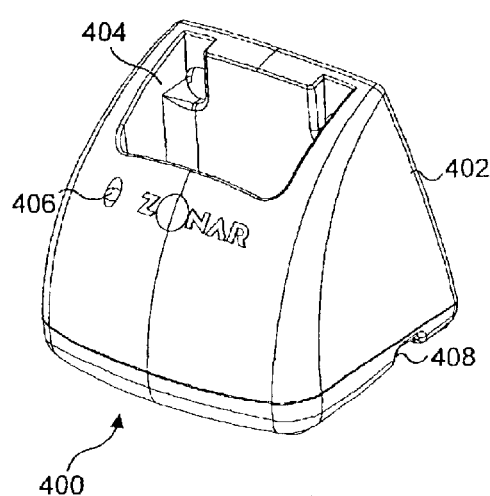
FIG. 14 is an isometric view of a docking station for the portable device.
Figure 15:
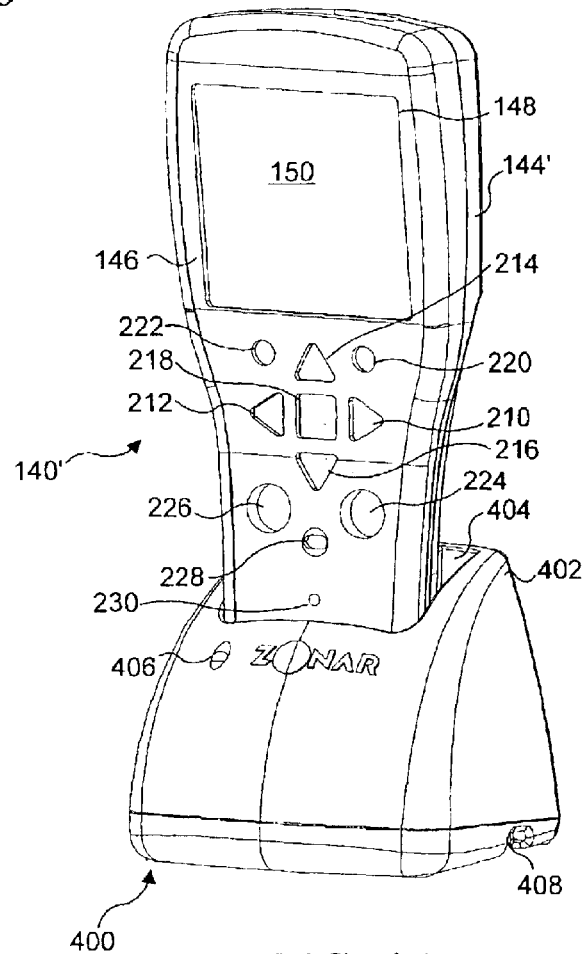
FIG. 15 is an isometric view of the second or third embodiment seated within the docking station for data transfer.
Figure 16:
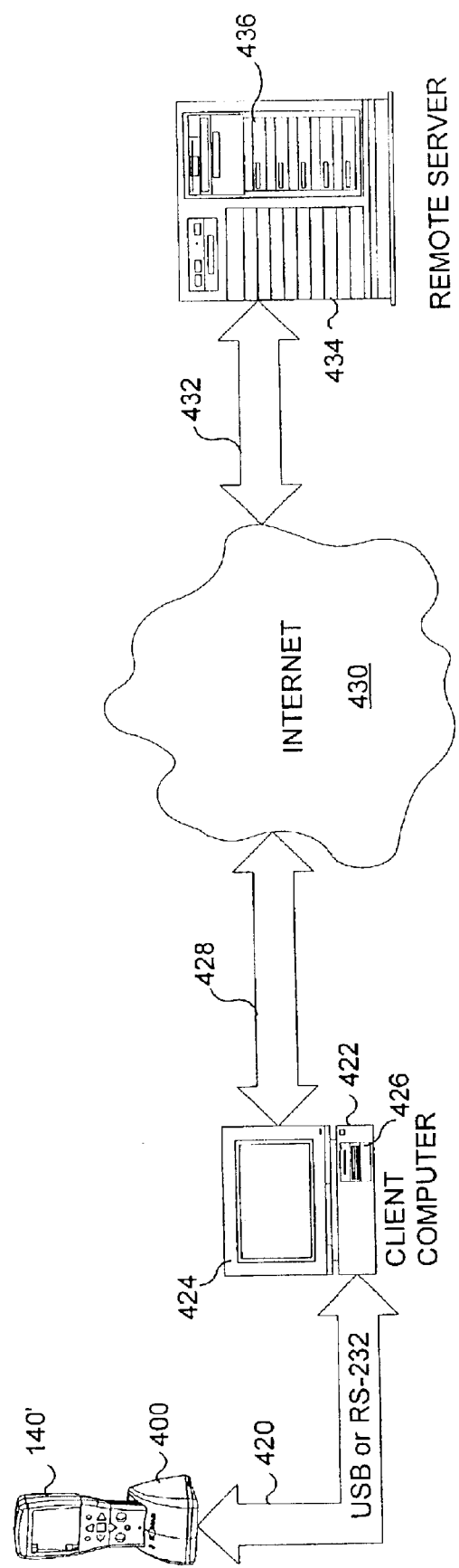
FIG. 16 is a schematic diagram of the system for transferring data over the Internet, between the portable device in the docking station and storage on a remote server.

FIGS. 14 and 15 illustrate a docking station 400 for the portable device of the present invention. Docking station 400 includes a housing 402 having a receptacle 404 into which either portable device 140 or 140' can be fitted. FIG. 15 illustrates portable device 140' inserted within receptacle 404 to facilitate downloading of the data stored within the portable device to a remote storage. The docking station 400 includes an indicator light 406 that changes color to indicate that data are being transmitted from portable device 140 or 140' to another device. Docking station 400 includes an interface circuit that couples the data port on portable device 140 or 140' to a personal computer 422 through a lead 420, as shown in FIG. 16. The interface circuit converts the data format of portable device 140 and 140' to a universal serial bus (USB) or serial RS-232 format for communication with personal computer 422. Accordingly, data link 420 is connected either to the USB port or serial port on personal computer 422 from a port 408 on docking station 400 (see FIGS. 14 and 15). It is also contemplated that other types of computing devices might be used instead of portable computer 422, and other types of data format can be employed. As shown, portable computer 422 has a display monitor 424 and a hard drive 426 for recording data temporarily transferred from portable device 140 and 140'. Subsequently, the data stored on hard drive 426 are downloaded through a data link 428, over Internet 430, and through a data link 432 to a remote server 434, which includes additional storage in the form of a plurality of hard drives 436. It is contemplated that docking station 400 might be disposed in a terminal or other location to which the portable device is returned between inspections or at other times, to transfer data from the memory within the portable device to remote storage on remote server 434.

Data links 428 and 432 can each comprise a telephone modem connection over a telephone network, a wireless data link, a broadband connection through a DSL interface or cable modem, or a cell phone link. Alternatively, personal computer 422 can be directly connected over a local area or wide area network to remote server 434. In general, it is only necessary that the data stored within portable device 140 or 140' resulting from one or more inspections be transferred to a more permanent storage, whether in personal computer 422 or in remote server 434, so that the memory within the portable device is thereafter available to store data from further inspections. By providing remote storage of the data that is downloaded from the portable device from time to time, the security and maintenance of the data are ensured.

Figure 13:
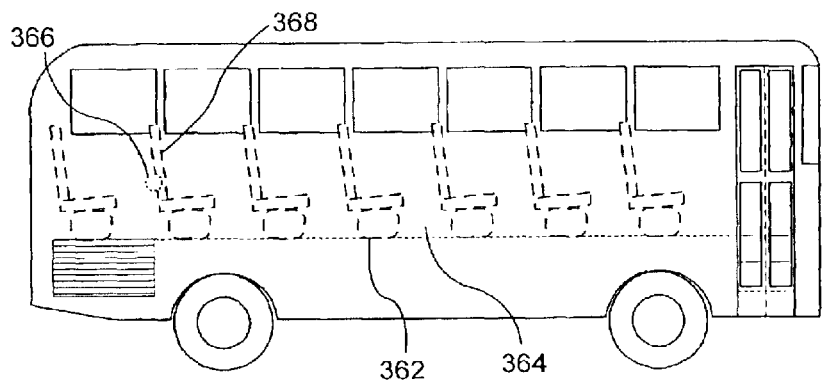
FIG. 13 is a side elevational view of a bus, illustrating the disposition of a token adjacent to a rear of the bus that is scanned to ensure that a driver of the bus has inspected all of the seats to determine whether all passengers have been unloaded from the bus.

FIG. 13 illustrates another aspect of the present invention. For purposes of carrying out safety inspections of a bus 360, which may be a school bus, a last safety check made by the operator (e.g., the driver) might be a check to ensure that all of the passengers have exited from the bus. As shown in FIG. 13, bus 360 includes a plurality of seats 362 at spaced-apart intervals along an aisle 364. To ensure that a child has not fallen asleep or hidden below or behind the seats, at the end of the route, the driver should make a thorough visual inspection of all of the seats in bus 360, which can only be done by walking to the rear of the bus. Accordingly, a token 366 is attached to the back of a seat 368 disposed adjacent to the rear of the bus. By bringing the portable device in proximity with token 366, the operator can thereby confirm that the rear of the bus was visited at the end of a route to ensure that the driver at least had the opportunity to visually confirm that no passengers remained on the bus. Without making such an inspection, it is possible that child might remain on a bus when it is returned to a facility for storage, which at the very least, would cause considerable concern to the parents of the child. Thus, the present invention helps to ensure that the driver is motivated to make an inspection to ensure that no child remains on the bus at the end of a route.

Other Type of Portable Device

While it is likely that an initial preferred embodiment will employ portable device 20, 140, or 140', it is also contemplated that an accessory might be provided for a personal digital assistant (PDA), such as the PALM™ PDA, that would enable the PDA to be used for the same functions as the portable devices discussed above. The accessory to the PDA would include a sensor to detect when the PDA is within the predetermined maximum range from the token associated with the component currently being inspected. The conventional controls on the PDA can be used to make and enter a selection. Furthermore, instead of using a cursor control, it is also contemplated that a touch screen display might instead be used for making selections of menu items and other options presented to the operator. In addition, the PDA would need to be programmed to carry out the functions implemented by the portable devices described above.

Other Applications of the Present Invention

Although the present invention will initially be used in connection with safety inspections of tractors and trailers in the commercial trucking industry, there are many other types of safety inspections unrelated to vehicles in which it is equally applicable. Other types of vehicles besides trucks, such as aircraft and buses, can also benefit from use of the present invention to provide proof that the components of the vehicle have been visited and observed by the operator or other person doing an inspection. Still other applications of the invention are not related to vehicles. For example, in a chemical processing plant or a petroleum refinery it is common for technicians to make periodic safety inspections of valves, gauges, reactors, pressure vessels, and other types of processing equipment and system components to ensure that they are operating properly and within nominal or acceptable limits. During an inspection, a technician may note that a valve is leaking slightly, and schedule it for repair or replacement at a later date. Clearly, if the leak is of a non-hazardous substance and is insignificant in volume, there might well be no reason to shut down the process line in which the valve is installed simply because of the leaking valve. However, if the valve controls an extremely hazardous or toxic substance, even a small leak may be unacceptable. In this case, the technician should immediately report the leaking condition of a valve to a supervisor who would then likely shut down the process or divert the flow of hazardous substance to a different process line to enable the condition to be corrected by immediate replacement or repair of the valve. Additional applications, without any implied limitation, include the inspection of amusement park rides, such as roller coasters, etc., where the condition of many different components of the ride can directly impact on its safety.

Although the preceding discussion discloses how a first preferred embodiment of the present invention is used in recording data related to safety inspections of a vehicle, it should be evident that portable device 20, 140 or 140' is readily adapted to recording data from virtually any type of inspection. In the example of a non-vehicular inspection in a chemical processing plant just noted, a technician would be prompted by the portable device to inspect the valve, and once the portable device was within a predetermined distance of the valve, would be prompted to indicate a state of the valve. If the technician depressed either yellow control button 54 or red control button 56 (on portable device 20), or red button 226 (on portable device 140 or 140'), the display would provide a menu of possible conditions from which the technician could select, using the cursor control to select and indicate the observed condition of the valve. Also, other conditions that are not directly related to safety can be recorded with the present invention.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

What is claimed is:

1. A method for providing a record that a component was visited during a safety inspection, comprising the steps of:
   (a) providing a portable device for use in recording data related to the safety inspection, said portable device including a sensor that detects when the portable device is disposed proximate the component, producing a signal indicative thereof;
   (b) enabling an operator to move the portable device proximate the component; and
   (c) automatically producing a record of the signal produced by the sensor that is stored within the portable device, said record providing evidence that the operator was sufficiently close to the component to make a safety inspection of the component.

2. The method of claim 1, further comprising the step of enabling the operator to store an indication of a condition of the component determined by inspecting the component, said indication being stored in the portable device.

3. The method of claim 1, further comprising the step of providing an indication to the operator of the component that the operator is to inspect.

4. The method of claim 1, further comprising the steps of:
   (a) displaying to the operator a plurality of different possible conditions of the component;
   (b) enabling the operator to select one of the plurality of different possible conditions, to indicate a condition of the component determined by the operator; and
   (c) storing in the portable device a record of said one of the plurality of different possible conditions selected by the operator.

5. The method of claim 4, further comprising the step of transferring the record of the signal and the record of said one of the plurality of different possible conditions from the portable device to a storage that is separate from the portable device.

6. The method of claim 5, wherein the step of transferring comprises the step of transmitting each record using a data signal, over at least one of a wire network and a wireless network.

7. The method of claim 1, further comprising the step of affixing a token adjacent to the component, said sensor responding to the token to detect when the portable device is proximate the component.

8. The method of claim 7, wherein the token causes the signal produced by the sensor to identify the component.

9. The method of claim 7, further comprising the step of affixing a plurality of tokens adjacent to a corresponding plurality of other components that are to be visited during the safety inspection, each of the plurality of tokens being associated with and affixed adjacent to a different one of the plurality of other components and causing the signal produced by the sensor when the portable device is proximate the other component associated with the token to identify said other component.

10. The method of claim 9, further comprising the step of recording the signal produced by the sensor in response to the plurality of tokens associated with the plurality of other components as the portable device is brought within a predetermined range for each of the plurality of other components.

11. The method of claim 9, further comprising the step of specifying a predetermined range for each of the plurality of other components, thus enabling different predetermined ranges to be specified for each of the plurality of other components.

12. The method of claim 1, further comprising the step of enabling the operator to select one of a plurality of different states of the component that is being inspected.

13. The method of claim 12, wherein the plurality of states include at least two of:
   (a) a first state in which the component is safe to operate;
   (b) a second state in which the component requires servicing, but is still usable; and
   (c) a third state in which the component is not safe to use.

14. The method of claim 13, wherein if either the second or third states are identified by the operator making the safety inspection, further comprising the step of displaying a plurality of possible conditions of the component to enable the operator to select one of the conditions to indicate why the operator selected either the second state or the third state, as applicable.

15. The method of claim 14, further comprising the steps of automatically storing the state and the condition selected by the operator within the portable device.

16. The method of claim 1, wherein in order to move the portable device proximate the component, a disposition of the component is selected that encourages the operator to move so as to visually perceive a condition, further comprising the steps:
(a) prompting the operator to enter an indication of the condition, after the operator has moved so as to visually perceive the condition; and
(b) enabling the operator to store an indication of the condition in the portable device.

17. The method of claim 16, wherein the component is disposed adjacent to a rear of a passenger vehicle interior, the condition comprising a determination of whether the passenger vehicle interior is empty of passengers, which the operator visually perceives while moving toward the component.

18. A system for providing evidence that a plurality of components were visited during a safety inspection, comprising:
(a) a plurality of tokens, each token being associated with a different component that is to be visited during the safety inspection and affixed adjacent to said component; and
(b) a portable device adapted to be transported to each component to be visited and inspected during the safety inspection, said portable device including:
  (i) a housing;
  (ii) a display;
  (iii) an operator interface;
  (iv) a memory in which machine instructions and data are stored;
  (v) a sensor for detecting when the portable device is proximate each of the plurality of tokens, and thus within a predetermined maximum distance from each of the components with which said plurality of tokens are separately associated, said sensor producing a signal indicative that the portable device is within the predetermined maximum distance from the components; and
  (vi) a controller coupled to the display, the memory, the operator interface, and the sensor, said controller executing the machine instructions and causing the memory to store data indicative of each component visited during the safety inspection, in response to the signal produced by the sensor.

19. The system of claim 18, wherein the machine instructions executed by the controller cause the controller to respond to the signal from the sensor by displaying a prompt on the display that requests entry of a state of a component that is currently proximate to the portable device.

20. The system of claim 19, wherein said state indicates whether the component is okay, or requires service, or is unusable.

21. The system of claim 20, wherein if the component requires service or is unusable, the machine instructions executed by the controller further cause the controller to display a plurality of possible conditions of the component and to enable at least one of the conditions to be selected, said memory retaining data corresponding to the state and the condition selected.

22. The system of claim 18, wherein the portable device further comprises a transmitter that is used to transmit the data to a remote site for storage.

23. The system of claim 18, further comprising a network interface that couples the portable device to at least one of a wire and wireless network, to convey the data to a remote site for storage.

24. The system of claim 18, further comprising a radio frequency transmitter disposed in the portable device, wherein the plurality of tokens each comprises a radio frequency transponder that is excited by radio frequency energy emitted by the radio frequency transmitter, producing an altered radio frequency signal that is detected by the sensor.

25. The system of claim 18, wherein the plurality of tokens each produce a pattern of magnetic flux, and wherein the sensor detects the pattern of magnetic flux from a token to produce a signal indicative of a specific type of component associated with the token.

26. The system of claim 18, wherein the plurality of tokens each correspond to an optical pattern, and wherein said sensor detects the optical pattern of a token to produce a signal indicative of a specific type of component associated with the token.

27. The system of claim 18, wherein each of the plurality of tokens has a selected predetermined range at which the sensor detects the token, so that different predetermined ranges can be provided for different tokens in the plurality of tokens, providing a desired predetermined range for each different type of component with which a token is used.

28. The system of claim 18, wherein the portable device further comprises a light source for use in illuminating a component to facilitate its inspection.

29. The system of claim 18, wherein the portable device further comprises a digital camera that produces digital image data corresponding to an image of a component, for storage in the memory, said image providing evidence of a condition of the component when inspected.

30. The system of claim 29, wherein the digital camera comprises:
(a) an optical system that directs and focuses light received from a region; and
(b) an imaging detector, disposed to receive the light directed and focused by the optical system, and in response thereto, producing the digital image data.

31. The system of claim 30, wherein the digital image data are also coupled to the display, producing an image visible on the display that enables the operator to direct the digital camera to frame a desired image prior to storing the digital image data for the desired image in memory.

32. The system of claim 18, wherein a token is disposed in a position selected so as to ensure that in order for an operator to move the portable device proximate the token, the operator will become aware of a condition associated with the token.

33. The system of claim 32, wherein said token is disposed adjacent to a rear of an interior passenger space in a vehicle, so that the operator must move through the interior passenger space to position the portable device proximate said token, said condition being a determination by the operator of whether the interior passenger space is empty of passengers.

34. The system of claim 33, wherein the machine instructions further cause the controller to enable the operator to input an indication of the condition before concluding the safety inspection.

35. The system of claim 18, further comprising a docking station that electrically couples with the portable device to receive data stored in the memory of the portable device, said docking station having an interface that is adapted to convey the data over a network to a remote storage.

36. The system of claim 35, further comprising a computing device that is electrically coupled to the docking station to receive the data conveyed from the portable device, said computing device including a storage in which the data are at least temporarily stored, and a network link for conveying the data to a remote site.

37. The system of claim 36, wherein the docking station includes data interface that is adapted to couple to a data port on the computing device.

38. A portable data recorder for recording data during a safety inspection, said data at least indicating whether a checkpoint was visited during the safety inspection by an operator carrying the portable data recorder, comprising:

(a) a housing;

(b) a display mounted on the housing;

(c) an operator interface mounted on the housing to enable input and selection of options provided on the display;

(d) a memory in which machine instructions and data are stored;

(e) a sensor for detecting when the portable device is proximate each of a plurality of checkpoints during the safety inspection, said sensor producing a signal indicating that the housing is proximate the checkpoint; and (f) a controller coupled to the display, the memory, the operator interface, and the sensor, said controller executing the machine instructions and causing the memory to store data indicative of each checkpoint visited during the safety inspection, in response to the signal produced by the sensor.

39. The portable data recorder of claim 38, wherein each of the checkpoints corresponds to a specific portion of apparatus that is being inspected during the safety inspection, said data indicating the specific portion of the apparatus.

40. The portable data recorder of claim 39, wherein the controller prompts for input of a state of the specific portion of the apparatus currently being inspected, the state that is input with the operator interface being included in the data stored within the memory.

41. The portable data recorder of claim 40, wherein the operator interface is adapted to input one of a plurality of different states, including a state in which one of the following is indicated:

(a) the specific portion of the apparatus is operating within acceptable limits and is usable;

(b) the specific portion of the apparatus is in need of servicing; and (c) the specific portion of the apparatus is unusable because of a safety concern.

42. The portable data recorder of claim 41, wherein, if the specific portion of the apparatus is not operating within acceptable limits and is not usable, the controller is programmed to prompt for input of a current condition of the specific portion of the apparatus.

43. The portable data recorder of claim 41, wherein the operator interface includes at least one control for indicating the state of the specific portion of the apparatus currently being inspected.

44. The portable data recorder of claim 38, wherein once within a predefined range from each checkpoint, the sensor detects one of a magnetic field, an electrical field, an optical pattern, and a radio frequency signal that is associated with the checkpoint, to produce the signal indicating that the portable data recorder is proximate the checkpoint.

45. The portable data recorder of claim 38, further comprising a radio frequency transmitter that is used to transfer the data to a remote storage.

46. The portable data recorder of claim 38, further comprising a light source that is usable for illuminating a checkpoint to facilitate the operator visually inspecting the checkpoint during the safety inspection.

47. The portable data recorder of claim 38, further comprising a digital camera usable to produce and retain image data corresponding to an image of a checkpoint within the memory.

48. The portable data recorder of claim 47, wherein the digital camera includes an optical lens, and a pixilated light sensor, said optical lens directing and focusing light onto the pixilated light sensor, causing the pixilated light sensor to produce an output signal corresponding to said light that is incident on the pixilated light sensor, said output signal being captured and stored in a digital format in the memory for subsequent retrieval and display.

49. The portable data recorder of claim 48, wherein the output signal is coupled to the display, to produce an image that enables the digital camera to be aimed as desired, before the output signal is captured and stored in the memory.

50. The portable data recorder of claim 47, wherein the machine instructions stored in the memory cause the controller to prompt an operator to selectively digitally record an image of a checkpoint with the digital camera.

51. The portable data recorder of claim 50, wherein the data stored in the memory and data corresponding to the digital image comprise evidence of a safety status of a checkpoint for apparatus being inspected.

* * * * *